Jan. 2, 1968   J. R. TURUNEN   3,360,963
JOINT
Original Filed May 8, 1963

INVENTOR.
John R. Turunen
BY
A. M. Heiter
ATTORNEY

United States Patent Office 3,360,963
Patented Jan. 2, 1968

3,360,963
JOINT
John R. Turunen, Royal Oak, Mich., assignor to General Motors Corporation, Detroit, Mich., a corporation of Delaware
Original application May 8, 1963, Ser. No. 278,914, now Patent No. 3,264,895, dated Aug. 9, 1966. Divided and this application Feb. 3, 1966, Ser. No. 524,732
6 Claims. (Cl. 64—13)

ABSTRACT OF THE DISCLOSURE

A universal joint connecting rotatable members having a flexible disc assembly drive including a pair of overlapping clamp members which effect bending of the flexible discs at two different points during joint rotation and also effect conjoint movement of the rotatable joint members when a pulling force is applied.

---

This invention relates to joints and more particularly to universal joints and is a division of applicant's copending application Ser. No. 278,914 filed May 8, 1963, now Patent No. 3,264,895.

The universal joint according to this invention is embodied in a structure having a pair of spaced rotatable members whose axes of rotation are intersectable. Each rotatable member has a portion offset from its axis and diagonally opposite the other offset portion. A flexible disc assembly is located between the rotatable members and the offset portions, and clamps arranged on opposite sides of the flexible disc assembly and opposite the offset portions overlap each other. Rivets secure each clamp member and the flexible disc assembly to the offset portions to prevent relative rotational movement therebetween whereby the joint thus provided effects conjoint movement of the rotatable members when a pulling force is applied and the flexible disc assembly bends alternately about the clamps during joint rotation.

An object of this invention is to provide an improved and simplified universal joint having a flexible drive for effecting conjoint movement of the rotatable joint members under tension loads.

Another object of this invention is to provide a universal joint having a flexible disc assembly drive for transmitting in-phase movement under tension loading, for transmitting forces during compression loading and for alternately bending about different points during joint rotation.

These and other objects of this invention will be more apparent from the following description and drawing of the preferred embodiment of the invention in which.

Figure 1:
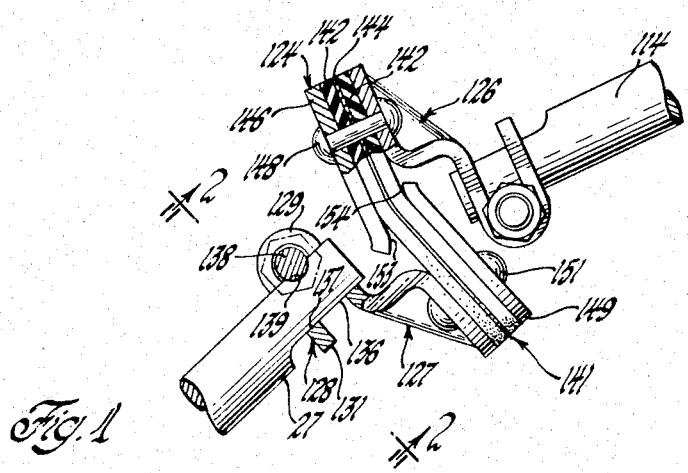
FIGURE 1 is a view, with parts in section, of the universal joint constructed according to the invention.

The universal joint is illustrated as being adapted to connect the control rods of the gear selector linkage shown in my application Ser. No. 278,914 wherein it is only necessary that the universal joint accurately transmit movement in one direction and rotate through only a small arc in effecting gear selection.

As shown in the drawing, the universal joint 124 is comprised of a pair of identical coupling or flange members 126 and 127 adapted to be secured to the control rods 114 and 27 respectively. Each flange member such as flange member 127 has a tongue portion 128 looped to form a bight or bend 129 and spaced parallel legs 131. Legs 131 have aligned apertures in the shape of partial circular openings 134 having a diameter slightly larger than that of the control rod to which it is adapted to be connected, in this instance control rod 27. To insure against relative rotation between the control rod and flange member the end of each control rod, such as control rod 27, is provided with a flat 136 which is engaged by a flat side wall portion 137 of the openings 134. The tongue portion 128 is slotted inwardly from the bend 129 into the openings 134 by a slot 135 to divide the legs into opposed jaw portions. Each flange member, such as flange member 127, has a bolt 138 received in the bight 129 and in a notch 139 provided in the ends of the control rods. Upon tightening of the bolt 138, the jaw portions of the flange member are brought closer together to tightly grip the control rod. The notch 139 insures against lateral movement of the bolt 138 and the flange member 127 along the control rod.

A flexible disc assembly 141 interconnects the flange members 126 and 127 and comprises a pair of discs 142 of woven material and a center disc 144 of thin spring steel which insures accurate rotary torque transmissions.

Figure 3:
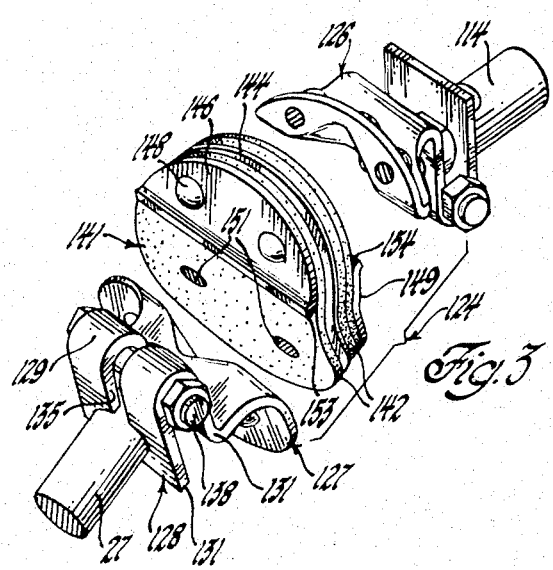
FIGURE 3 is an exploded view of the universal joint.

As best shown in FIGURES 1 and 3, the flange members 126 and 127 are opposite each other and rotated 180° apart and a clamping member 146 secured to the flange member 126 by suitable rivets 148 and an identical clamping member 149, 180° apart from clamping member 146, secured to the flange member 127 by suitable rivets 151 hold the flexible disc assembly 141 in position to transmit drive from one flange member to the other.

The clamping members 146 and 149 are partially circular to conform to the discs 142 and 144 and are slightly larger than a semi-circle having curved portions 153 and 154 respectively extending chordally thereacross. The curved portions 153 and 154 are curved outwardly from the opposite sides of the flexible disc assembly 141 and overlap sufficiently so that an outward or pulling force on the universal joint is transmitted through the universal joint from one control rod to the other. Thus, the control rods move conjointly when there is a pulling force on the universal joint. If there is applied a pushing force on the universal joint by one control rod, the discs 142 and 144 may bend prior to the transmittal of a force sufficient to move or push the other control rod. The joint does not transmit vibration due to engine transmission movement on its vibration damping mounting. Since the gear selector mechanism being operated requires only a pulling force on control rod 27 to effect gear selector mechanism operation, the universal joint is ideally suitable for that purpose.

Since the curved portions 153 and 154 of the clamping members overlap, the bending of the flexible discs 142 and 144 occurs at two different points depending on the direction of bending. When the universal joint is rotated through a full 360°, this varying of the bending points acts to prolong the life of the joint since the bending stresses are better distributed than if there were only one point about which the discs bent. As viewed in FIGURE 1, the flexible disc assembly is shown bent about curved portion 154 and upon rotation of the universal joint through 180°, the flexible disc assembly will gradually alternate from bending about curved portion 154 to bending about curved portion 153. As the control rods and the universal joint rotate, the axes of the control rods intersect at a point within the flexible disc assembly and establish a virtual center about which rotation takes place.

Figure 2:
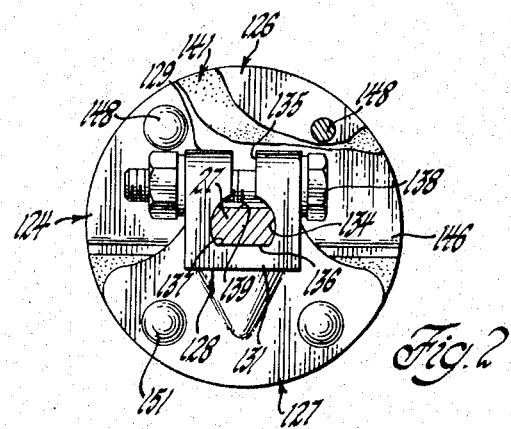
FIGURE 2 is a view taken on the line 2—2 in FIGURE 1.

Since the above universal joint is in the nature of a hinged joint construction, upon rotation in either direction from the position shown there will occur twisting of the flexible disc assembly in addition to bending of the flexible disc assembly about curved portions 153 and 154. This twisting of the flexible disc assembly will act to pull the control rods toward each other and this twisting increases as the universal joint is rotated in either direction until it reaches a maximum which occurs at 90° rotation of the universal joint from the position shown in FIGURES 1 and 2 and thereafter decreases as the universal joint is continued to be rotated in the same direction until it reaches zero which corresponds to 180° rotation of the universal joint from the position shown in FIGURES 1 and 2. Upon further rotation in the same direction, the flexible disc assembly which is then bent only about curved portion 153 again twists with the twist increasing until it reaches a maximum at 270° rotation and thereafter diminishes to zero at 360° rotation where the cycle is completed.

Since the control rod 27 is rotated through only a small arc much smaller than 90° to move the gear selector rail members in either direction from their neutral position to their shift position, the universal joint 124 is only required to be rotated through a corresponding small arc to effect the different shifts. Since the universal joint is initially in the position shown in FIGURES 1 and 2 which corresponds to neutral and the control rod 27 and joint 124 are rotated through only a small arc to effect the different shifts, the twisting of the flexible disc assembly will vary between zero in neutral and some very small amount in the different shift positions. Since this twisting is very small the pulling together of the control rods is negligible and does not affect the operation of the gear selector mechanism. The above joint provides a simplified and inexpensive universal joint or coupling to couple a pair of inclined control rods and readily lends itself to mass production.

The above-described preferred embodiment is illustrative of the invention which may be modified within the scope of the appended claims.

I claim:

1. In a universal joint the combination of spaced rotatable members whose axis are intersectable; each rotatable member having an offset portion offset from its axis; the offset portions of said rotatable members being diagonally opposite each other; flexible drive means between said rotatable members and offset portions; clamping members on the opposite sides of said flexible drive means overlapping each other where the axes are intersectable and arranged opposite said offset portions; securing means securing one clamping member and said flexible drive means to one offset portion to prevent relative rotational movement therebetween and securing means securing the other clamping member and said flexible drive means to the other offset portion to prevent relative rotational movement therebetween whereby conjoint movement of the rotatable members is effected by cooperation of said flexible drive means and said clamping members when a pulling force is applied to the joint and said flexible drive means bends alternately about said clamping members when the joint is rotated.

2. The universal joint set forth in claim 1 and said flexible drive means including a steel disc.

3. The invention set forth in claim 2 and a pair of discs having greater internal damping than said steel disc sandwiching said steel disc.

4. In a universal joint the combination of spaced rotatable members whose axis are intersectable; each rotatable member having an offset portion offset from its axis; the offset portions of said rotatable members being diagonally opposite each other; flexible disc means intermediate said rotatable members and offset portions; plate members disposed on the opposite sides of said flexible disc means; said plate members having a curved portion extending outwardly from said flexible disc means and along a cord of said plate member; said plate members being arranged opposite said offset portions and relative to each other so that said curved portions overlap; and securing means securing one plate member and said flexible disc means to one offset portion to prevent relative rotational movement therebetween, and the other plate member and said flexible disc means to the other offset portion to prevent relative rotational movement therebetween.

5. In a universal joint the combination of spaced rotatable members whose axis are intersectable; each rotatable member having an offset portion offset from its axis; flexible disc means comprising a pair of discs of woven material and a thin spring steel disc therebetween; said flexible disc means disposed between said rotatable members and opposite said offset portions; plate members disposed on the opposite outermost sides of said flexible disc means; said plate members having a curved portion curved away from said flexible disc means and extending along a chord of said plate members; said plate members being arranged opposite said offset portions and said offset portions being arranged diagonally opposite relative to each other; said plate members being arranged relative to each other so that said curved portions overlap; and securing means securing one plate member and said flexible disc means to one offset portion to prevent relative rotational movement therebetween, and the other plate member and said flexible disc means to the other offset portion to prevent relative rotational movement therebetween.

6. In a universal joint the combination of spaced rotatable members whose axis are intersectable; each rotatable member having an offset portion offset from its axis; the offset portions of said rotatable members being diagonally opposite each other; flexible drive means between said rotatable members and offset portions; clamping members on the opposite sides of said flexible drive means overlapping each other and arranged opposite said offset portions; securing means securing one clamping member and said flexible drive means to one offset portion to prevent relative rotational movement therebetween and securing means securing the other clamping member and said flexible drive means to the other offset portion to prevent relative rotational movement therebetween; said clamping members having a curved portion extending outwardly from said flexible drive means and along a chord of said clamping members; and said curved portions being arranged to overlap each other.

References Cited
UNITED STATES PATENTS

| 1,233,173 | 7/1917 | Blair | 64—13 |
| 1,376,107 | 4/1921 | MacDonald | 64—13 |
| 1,479,755 | 1/1924 | Stokes | 64—13 |
| 2,499,093 | 2/1950 | Fast | 64—13 |
| 3,213,643 | 10/1965 | Kelly | 64—13 |

MILTON KAUFMAN, *Primary Examiner.*

HALL C. COE, *Examiner.*